(12) United States Patent
Hajimiri

(10) Patent No.: US 11,726,383 B2
(45) Date of Patent: Aug. 15, 2023

(54) MODULAR HYBRID OPTICAL PHASED ARRAYS

(71) Applicant: California Institute of Technology, Pasadena, CA (US)

(72) Inventor: Seyed Ali Hajimiri, La Canada, CA (US)

(73) Assignee: California Institute of Technology, Pasadena, CA (US)

( * ) Notice: Subject to any disclaimer, the term of this patent is extended or adjusted under 35 U.S.C. 154(b) by 105 days.

(21) Appl. No.: 17/501,971

(22) Filed: Oct. 14, 2021

(65) Prior Publication Data

US 2022/0146904 A1 May 12, 2022

Related U.S. Application Data

(60) Provisional application No. 63/091,826, filed on Oct. 14, 2020.

(51) Int. Cl.
*G02F 1/295* (2006.01)
*H04B 10/25* (2013.01)

(52) U.S. Cl.
CPC ........... *G02F 1/2955* (2013.01); *H04B 10/25* (2013.01)

(58) Field of Classification Search
CPC .............................. G02F 1/2955; H04B 10/25
See application file for complete search history.

(56) References Cited

U.S. PATENT DOCUMENTS

| | | | |
|---|---|---|---|
| 5,333,000 A * | 7/1994 | Hietala | G02F 2/02 342/368 |
| 5,375,184 A * | 12/1994 | Sullivan | G02B 6/43 385/129 |
| 7,146,103 B2 | 12/2006 | Yee et al. | |
| 7,149,433 B2 * | 12/2006 | Grubb | H04J 14/0221 398/175 |
| 7,251,386 B1 * | 7/2007 | Dickinson | H04B 10/25 385/24 |
| 7,259,031 B1 * | 8/2007 | Dickinson | G02B 6/12004 438/23 |
| 7,561,797 B1 | 7/2009 | Harley et al. | |

(Continued)

OTHER PUBLICATIONS

International Search Report and Written Opinion dated Dec. 27, 2021, in application No. PCT/US2021/050530.

(Continued)

*Primary Examiner* — Andrew Jordan
(74) *Attorney, Agent, or Firm* — Weaver Austin Villeneuve & Sampson LLP

(57) ABSTRACT

An optical phased array includes a first multitude of tiles forming an array of optical signal transmitters and/or receivers. Each such tile includes optical components for processing of an optical signal. The phased array further includes a second multitude of tiles each positioned below one of the first multitude of tiles. Each of the second multitude of tiles includes a circuit for processing of an electrical signal and is in electrical communication with one or more of the first multitude of tiles. Each of the first multitude of tiles is adapted to receive in a modular form, be adjacent to, and couple to at least one additional tile that is similar to that tile. Each of the second multitude of tiles is adapted to receive in a modular form, be adjacent to, and couple to at least one additional tile that is similar to that tile.

26 Claims, 3 Drawing Sheets

(56) References Cited

U.S. PATENT DOCUMENTS

| | | | |
|---|---|---|---|
| 7,787,176 B2* | 8/2010 | Kimerling | H01S 5/50 359/344 |
| 8,213,751 B1* | 7/2012 | Ho | G02F 1/035 385/11 |
| 8,526,828 B2 | 9/2013 | Nakashima et al. | |
| 9,389,441 B2* | 7/2016 | Coult | G02F 1/0327 |
| 9,500,821 B2* | 11/2016 | Hochberg | G02B 6/1225 |
| 9,692,512 B2* | 6/2017 | Griffith | H01Q 5/22 |
| 9,726,840 B2* | 8/2017 | Chen | G02B 6/4274 |
| 10,236,975 B2* | 3/2019 | Li | H04B 10/0731 |
| 10,250,330 B1 | 4/2019 | Cabello et al. | |
| 10,288,804 B2* | 5/2019 | Bao | H01L 31/022408 |
| 10,439,282 B2 | 10/2019 | Murakowski | |
| 10,591,684 B2* | 3/2020 | Shaw | G02B 6/4204 |
| 10,598,968 B2* | 3/2020 | Behroozpour | H04B 10/50 |
| 10,613,410 B2* | 4/2020 | Hosseini | G02F 1/292 |
| 10,634,845 B2* | 4/2020 | Aflatouni | G02F 1/292 |
| 10,656,496 B2* | 5/2020 | Hashemi | G02F 1/2955 |
| 10,790,585 B2* | 9/2020 | Poulton | G02F 1/2955 |
| 10,790,909 B1* | 9/2020 | Suni | H04B 10/50 |
| 10,866,487 B1* | 12/2020 | Keller | G02F 1/365 |
| RE48,379 E * | 1/2021 | Ho | G02B 6/43 |
| 10,901,089 B2* | 1/2021 | Zhang | G01S 7/4861 |
| 10,914,900 B1* | 2/2021 | Kendrick | G01B 9/02041 |
| 10,958,356 B2* | 3/2021 | De-Lamberterie | H04W 4/44 |
| 11,029,578 B2* | 6/2021 | Safavi-Naeini | G02F 1/335 |
| 11,085,998 B2* | 8/2021 | Sayyah | G02F 1/0955 |
| 11,093,215 B2* | 8/2021 | Harris | G01J 1/46 |
| 11,105,989 B2* | 8/2021 | Lim | G02B 6/4231 |
| 11,169,780 B2* | 11/2021 | Harris | G06F 7/523 |
| 11,256,029 B2* | 2/2022 | Kannan | G02B 6/13 |
| 11,281,972 B2* | 3/2022 | Shen | G02F 1/00 |
| 11,300,852 B2* | 4/2022 | Wang | G02B 26/0833 |
| 11,307,483 B2* | 4/2022 | Gong | G02B 6/3536 |
| 11,320,588 B1* | 5/2022 | Mazed | G16H 10/40 |
| 11,340,399 B2* | 5/2022 | Wang | G02B 6/125 |
| 11,360,270 B2* | 6/2022 | Wang | G02B 6/3536 |
| 11,494,541 B2* | 11/2022 | Ramey | G06F 30/327 |
| 11,500,072 B2* | 11/2022 | Sarkissian | G01S 7/4812 |
| 11,507,818 B2* | 11/2022 | Hosseinzadeh | G06N 3/0675 |
| 11,520,213 B2* | 12/2022 | Safavi-Naeini | G02F 1/335 |
| 11,537,025 B2* | 12/2022 | Ni | G02F 1/2955 |
| 11,543,592 B2* | 1/2023 | Dong | G02B 6/4274 |
| 11,562,942 B2* | 1/2023 | Liu | G02B 6/125 |
| 11,609,742 B2* | 3/2023 | Harris | G06F 7/523 |
| 2002/0154371 A1 | 10/2002 | West, Jr. | |
| 2003/0048527 A1* | 3/2003 | Kimerling | H01S 5/50 359/344 |
| 2004/0001248 A1* | 1/2004 | Grubb | H04B 10/2939 359/333 |
| 2009/0232508 A1 | 9/2009 | Rumpf et al. | |
| 2012/0082466 A1 | 4/2012 | Wu et al. | |
| 2014/0360013 A1* | 12/2014 | Chen | G02B 6/4274 29/830 |
| 2015/0180580 A1* | 6/2015 | Coult | G02F 1/0327 398/183 |
| 2016/0036529 A1* | 2/2016 | Griffith | H01Q 5/22 398/116 |
| 2016/0116688 A1* | 4/2016 | Hochberg | G02B 6/4232 385/14 |
| 2018/0039154 A1* | 2/2018 | Hashemi | G02F 1/2955 |
| 2018/0107091 A1* | 4/2018 | Hosseini | G02F 1/292 |
| 2018/0113256 A1* | 4/2018 | Shaw | G02B 6/4249 |
| 2018/0172908 A1* | 6/2018 | Bao | G02B 6/1226 |
| 2018/0234177 A1* | 8/2018 | Li | H04B 10/40 |
| 2018/0343063 A1 | 11/2018 | Tsunoda | |
| 2019/0028197 A1 | 1/2019 | Turner et al. | |
| 2019/0097724 A1 | 3/2019 | Ye et al. | |
| 2019/0129008 A1* | 5/2019 | Lin | G01S 7/4804 |
| 2019/0227351 A1* | 7/2019 | Behroozpour | G01S 7/4815 |
| 2019/0260123 A1* | 8/2019 | Poulton | H01Q 3/2676 |
| 2020/0145110 A1 | 5/2020 | Schuetz et al. | |
| 2020/0192184 A1* | 6/2020 | Safavi-Naeini | G02F 1/125 |
| 2020/0284883 A1* | 9/2020 | Ferreira | G01S 17/10 |
| 2021/0103199 A1* | 4/2021 | Wu | G01S 7/4818 |
| 2021/0109302 A1* | 4/2021 | Lim | G02B 6/3636 |
| 2021/0116543 A1* | 4/2021 | Huang | G02B 27/30 |
| 2021/0124024 A1* | 4/2021 | Sarkissian | G01S 7/4916 |
| 2021/0124031 A1* | 4/2021 | Sarkissian | G01S 7/4817 |
| 2021/0124048 A1* | 4/2021 | Sayyah | G01S 17/34 |
| 2021/0124118 A1* | 4/2021 | Sayyah | G01S 17/34 |
| 2021/0166991 A1* | 6/2021 | Liu | H01L 23/473 |
| 2021/0201126 A1* | 7/2021 | Meng | G02F 3/00 |
| 2021/0224454 A1* | 7/2021 | Ramey | G02B 26/06 |
| 2021/0278707 A1* | 9/2021 | Moss | G02B 26/06 |
| 2021/0341814 A1* | 11/2021 | Safavi-Naeini | G02F 1/335 |
| 2021/0382142 A1* | 12/2021 | Rogers | G01S 17/89 |
| 2021/0382371 A1* | 12/2021 | Ni | G02F 1/2955 |
| 2021/0392419 A1* | 12/2021 | Meister | G02B 6/423 |
| 2022/0011430 A1* | 1/2022 | Guo | G01S 17/58 |
| 2022/0059950 A1* | 2/2022 | Brown | H01Q 1/246 |
| 2022/0085886 A1 | 3/2022 | Hajimiri | |
| 2022/0091332 A1* | 3/2022 | Yoo | G02B 6/424 |
| 2022/0091349 A1* | 3/2022 | Testa | G02B 6/124 |
| 2022/0113607 A1 | 4/2022 | Hajimiri | |
| 2022/0128666 A1* | 4/2022 | Schrans | G01S 17/42 |
| 2022/0146904 A1* | 5/2022 | Hajimiri | H04B 10/25 |
| 2022/0155526 A1* | 5/2022 | Dong | G02B 6/4249 |
| 2022/0158736 A1* | 5/2022 | Testa | G02B 6/4245 |
| 2022/0179159 A1* | 6/2022 | Wu | G02B 6/4204 |
| 2022/0216922 A1* | 7/2022 | Hashemi | H04B 10/615 |
| 2022/0283308 A1* | 9/2022 | Schrans | G01S 7/4817 |
| 2022/0291024 A1* | 9/2022 | Camozzi | G01D 5/35316 |
| 2022/0319971 A1* | 10/2022 | Lee | H01L 23/49827 |
| 2022/0334451 A1* | 10/2022 | Wu | G02F 1/2955 |
| 2022/0384409 A1* | 12/2022 | Peng | H01L 25/18 |
| 2022/0397726 A1* | 12/2022 | Karhade | G02B 6/4202 |
| 2022/0404544 A1* | 12/2022 | Winterbottom | G06F 7/5443 |
| 2022/0404545 A1* | 12/2022 | Winterbottom | G06N 3/04 |
| 2022/0405056 A1* | 12/2022 | Winterbottom | G06F 7/5443 |
| 2022/0405562 A1* | 12/2022 | Winterbottom | G02B 6/30 |
| 2022/0405566 A1* | 12/2022 | Winterbottom | G06F 7/50 |
| 2023/0041793 A1* | 2/2023 | Kurz | G01S 13/931 |
| 2023/0088198 A1* | 3/2023 | Dong | G02B 6/421 |

OTHER PUBLICATIONS

International Search Report and Written Opinion dated Jan. 26, 2022, in PCT Application No. PCT/US2021/054638.

Prather, D.W., et al., "Optically Upconverted, Spatially Coherent Phased Array-Antenna Feed Networks for Beam-Space MIMO in 5G Cellular Communications", IEEE Transactions on Antennas and Propagation. IEEE, Aug. 3, 2017, vol. 65, No. 12, pp. 6432-6443.

U.S. Final office Action dated Mar. 22, 2023 in U.S. Appl. No. 17/499,798.

U.S. Non-Final Office Action dated Jun. 24, 2022, in U.S. Appl. No. 17/499,798.

U.S. Restriction Requirement dated Oct. 25, 2022 in U.S. Appl. No. 17/476,375.

* cited by examiner

MODULAR HYBRID OPTICAL PHASED ARRAYS

CROSS REFERENCE TO RELATED APPLICATIONS

The present application claims benefit under 35 USC 119(e) of application Ser. No. 63/091,826 filed Oct. 14, 2020, the contents of which is incorporated herein by reference in its entirety.

FIELD OF THE INVENTION

The present application relates to optical phased arrays, and more particularly to modular optical phased arrays.

BACKGROUND OF THE INVENTION

Optical phased arrays are used in shaping and steering a narrow, low-divergence, beam of light over a relatively wide angle. An integrated optical phased array photonics chip often includes a number of components such as lasers, photodiodes, optical modulators, optical interconnects, transmitters and receivers.

Optical phased arrays may be used, for example, in free-space optical communication where the laser beam is modulated to transmit data. Optical phased arrays have also been used in 3D imaging, ranging and sensing (LIDAR), mapping, communications, and other emerging technologies like autonomous cars and drone navigation.

An optical phased array may be formed on a photonic integrated circuit and include a relatively large number of optical couplers that can operate as transmitting antennas and/or receiving antennas. Many applications can benefit from a large aperture size of an optical phased array. On the transmit side, the gain, the effective isotropic radiated power, beamforming, beam-steering, and focusing capabilities of an optical phased array scale favorably as the number of elements of the optical phased array increases. On the received side, the larger the aperture size, the greater is the array gain, and its ability to form a listening/gazing beam in the desired direction, while suppressing the incident signal from other directions. A need continues to exist for a scalable optical phased array, particularly in planar processes.

BRIEF SUMMARY OF THE INVENTION

An optical phased array, in accordance with one embodiment of the present disclosure includes, in part, a first multitude of tiles forming an array of optical signal transmitters and/or receivers. Each such tile includes, in part, optical components for processing of an optical signal received by the tile. The optical phased array further includes, in part, a second multitude of tiles each positioned below a different one of the first multitude of tiles. Each of the second multitude of tiles includes, in part, a circuit for processing of an electrical signal and is in electrical communication with one or more of the first multitude of tiles. Each of the first multitude of tiles is adapted to receive, be adjacent to, and couple to at least one additional tile that is similar to that tile and includes similar optical components. Each of the second multitude of tiles is adapted to receive, be adjacent to, and couple to at least one additional tile that is similar to that tile and includes similar electrical circuitry. The phased array is thus adapted to receive more tiles in a modular fashion to increase its size and aperture.

In one embodiment, each of the first and second multitude of tiles is disposed on a printed circuit board. In one embodiment, the optical phased array is adapted to receive a continuous-wave laser via an optical distribution medium. In one embodiment, the optical distribution medium is an optical fiber. In one embodiment, each of at least a subset of the first multitude of tiles includes a source of laser.

In one embodiment, the first multitude of tiles have same dimensions. In one embodiment, each of the first multitude of tiles has dimensions that are similar to the dimensions of each of the second multitude of tiles. In one embodiment, each of the first and second multitude of tiles has a regular shape. In one embodiment, each of the first multitude of tiles is adapted to receive an electrical signal from one of the second multitude of tiles that is positioned below the first multitude of tiles. In one embodiment, each of the second multitude of tiles includes an electrical interconnect formed below the tile.

A method of forming an optical phased array, in accordance with one embodiment of the present disclosure includes, in part, forming a first multitude of tiles that operate as an array of optical signal transmitters and/or receivers. Each of the first multitude of tiles includes optical components for processing of an optical signal received by the tile. The method further includes, in part, forming a second multitude of tiles each including circuitry for processing of an electrical signal. The method further includes, in part, positioning each of the second multitude of tiles below a different one of the multitude of first tiles. Each of the second multitude of tiles is in electrical communication with one or more of the first multitude of tiles. Each of the first multitude of tiles is adapted to receive, be adjacent to, and couple to at least one additional tile that is similar to that tile and includes optical components. Each of the second multitude of tiles is adapted to receive, be adjacent to, and couple to at least one additional tile that is similar to that tile and includes an electrical circuit. The phased array is thus adapted to receive more tiles in a modular fashion to increase its size and aperture.

In one embodiment, the method further includes, in part, disposing the first and second multitude of tiles on a printed circuit board. In one embodiment, the method further includes, in part, delivering a continuous-wave laser to the multitude of tiles via an optical distribution medium. In one embodiment, the optical distribution medium is an optical fiber.

In one embodiment, the method further includes, in part, forming a laser on each of a subset of the first multitude of tiles. In one embodiment, the first multitude of tiles have same dimensions. In one embodiment, each of the first multitude of tiles has dimensions that are similar to the dimensions of each of the second multitude of tiles. In one embodiment, each of the first and second multitude of tiles has a regular shape. In one embodiment, the method further includes, in part, delivering an electrical signal from each of the second multitude of tiles to a different one of the first multitude of tiles that is positioned above the tile. In one embodiment, the method further includes, in part, forming an electrical interconnect below each of the second multitude of tiles.

DETAILED DESCRIPTION OF THE INVENTION

An optical phased array, in accordance with one embodiment of the present disclosure, includes a multitude of photonic integrated circuit (PIC) tiles disposed above a multitude of electronic integrated circuit (EIC) tiles. The optical phased array is therefore modular and highly scalable. To increase the size of the optical phased array so as to enlarge its aperture, more PIC and EIC tiles may be added to an existing optical phased array. As is described below, a portion of the signal distribution and processing of the signals is performed in the optical domain using optical components or opto-electronic components, and a portion of the signal distribution and processing of the signals is performed in the electrical domain using electrical signals and circuits.

Figure 1:
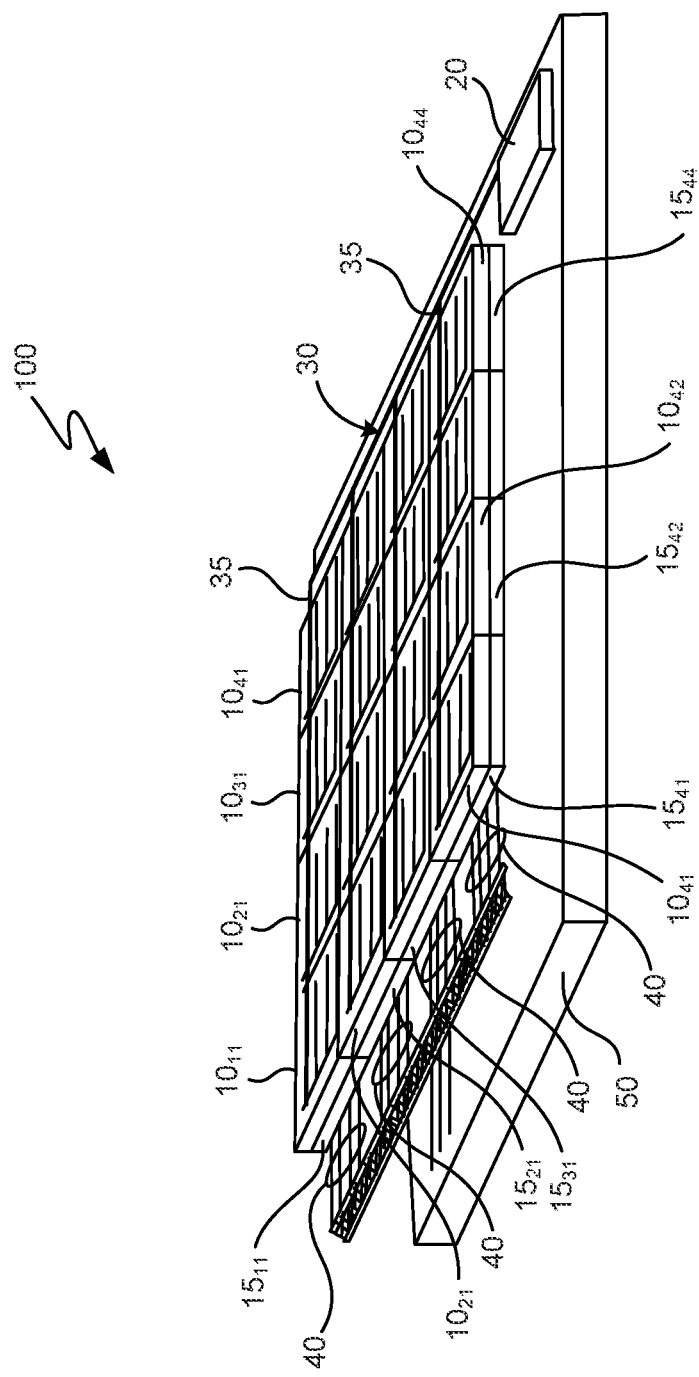
FIG. 1 is a simplified high-level block diagram of a modular optical phased array, in accordance with one exemplary embodiment of the present disclosure.

FIG. 1 is a simplified high-level block diagram of a modular optical phased array 100, in accordance with one exemplary embodiment of the present disclosure. Exemplary modular optical phased array 100 is shown as including, in part, a 4×4 array of PIC tiles positioned above a 4×4 array of EIC tiles. PIC tiles $10_{11}$, $10_{12}$, $10_{13}$ and $10_{14}$ are shown as forming a first row of the PIC array; PIC tiles $10_{21}$, $10_{22}$, $10_{23}$ and $10_{24}$ form the second row of the PIC array; and PIC tiles $10_{41}$, $10_{42}$, $10_{43}$ and $10_{44}$ form the fourth row of the PIC array. Each PIC or PIC tile disposed in the array is alternatively referred to herein as PIC $10_{ij}$, where i is an index identifying the row number of the PIC tile, and j is an index identifying the column number of the PIC tile. In the exemplary embodiment shown in FIG. 1, i and j are both 4. It is understood that a modular optical phased array, in accordance with embodiments of the present disclosure, may have any number of rows and columns, and therefore, i and j may be any positive integer.

Positioned below each PIC tile $10_{ij}$ is an ECI tile $15_{ij}$, as shown. For example, EIC tile $15_{11}$ is positioned below PIC tile $10_{11}$; EIC tile $15_{12}$ is positioned below PIC tile $10_{12}$; EIC tiles $15_{13}$ is positioned below PIC tile $10_{13}$, and EIC tile $15_{14}$ is positioned below PIC tile $10_{14}$. Both the array of PIC tiles $10_{ij}$ and the array of EIC tiles $15_{ij}$ are disposed above printed circuit board (PCB) 50. While modular optical phased array 100 is shown as having equal number of PIC and EIC tiles, it is understood that in other embodiments, the number of PIC and EIC tiles may be different.

The PIC tiles are adapted to be positioned in close proximity of one another and to couple to one another using, for example, an optical coupler, which is not shown in the Figure to improve clarity. To increase the size of the array of the optical phased array 100, new/additional PIC tiles may be positioned adjacent and coupled to existing PIC tiles, and new/additional EIC tiles may be added adjacent and coupled to existing EIC tiles. The spacing between adjacent EIC tiles is similar to the spacing between adjacent PIC tiles.

Phased array 100 is also shown as including, in part, a continuous-wave (CW) laser source 20 disposed on PCB 50. The laser generated by laser source 20 is delivered to the PIC tiles or PICs by an optical distribution medium 30, which may be an optical fiber. The optical signal received from optical fiber 30 is delivered to the PICs via optical waveguides 35. In other embodiments, each PIC may include a dedicated laser. In yet other embodiments, each of a subset of the PICs may include a source of laser shared by one or more of the PICs that do not include a laser.

Formed on the back side of each EIC are metal interconnects that are electrically connected to the wirings 40 of the PCT. Electrical signals used for processing of optical signals, such as the modulation of an optical signal by a Mach-Zehnder modulator, is delivered by the EICs to the PICs. In some embodiments, the PICs and EICs are connected using electrical contacts. In some embodiments, the PICs and EICs are connected through capacitive coupling. In some embodiments, the PICs and EICs are connected through magnetic coupling.

The PIC and EIC tiles are adapted to aggregate the data for the phased array receiver, or distribute and control the timing and phase for the phased array transmitter to generate the desired coherent beam. The PICs are adapted to perform any number of optical domain signal processing, such as optical phase modulation, and optical signal aggregation. The EICs are adapted to perform any number of electrical signal processing, such as timing adjustment, phase control/adjustment, calibration, equalization, frequency downconversion, and realignment of the data stream.

Figure 2:
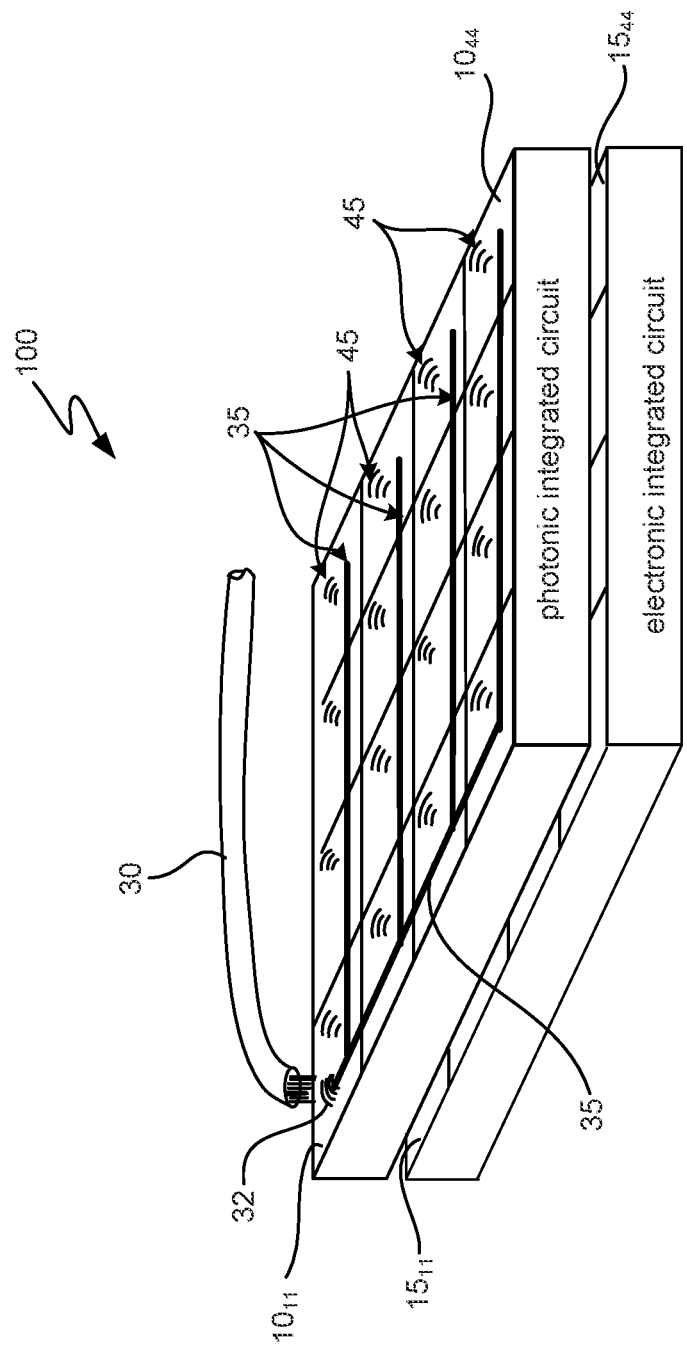
FIG. 2 is a more detailed view of the modular optical phased array of FIG. 1, in accordance with one exemplary embodiment of the present disclosure.

FIG. 2 is a more detailed view of optical phased array 100. Optical fiber 30 carrying the unmodulated laser is shown as being coupled to tile $10_{11}$ via coupler 32. Waveguides 35 distribute the laser received by optical coupler 32 to optical components disposed on PIC tiles. Optical radiators 45 radiate the optical signals delivered thereto.

In some embodiments, each modular PIC tile may include a multitude of PICs, interconnecting elements, substrates and board, among other components. Each EIC tile may include a number of EICs, interconnecting elements, substrates and board. In some embodiments, the modular tiles may have any regular shapes, such as square, rectangle, hexagon or other regular shapes. In other embodiments, the modular tiles may have an irregular shape.

Figure 3:
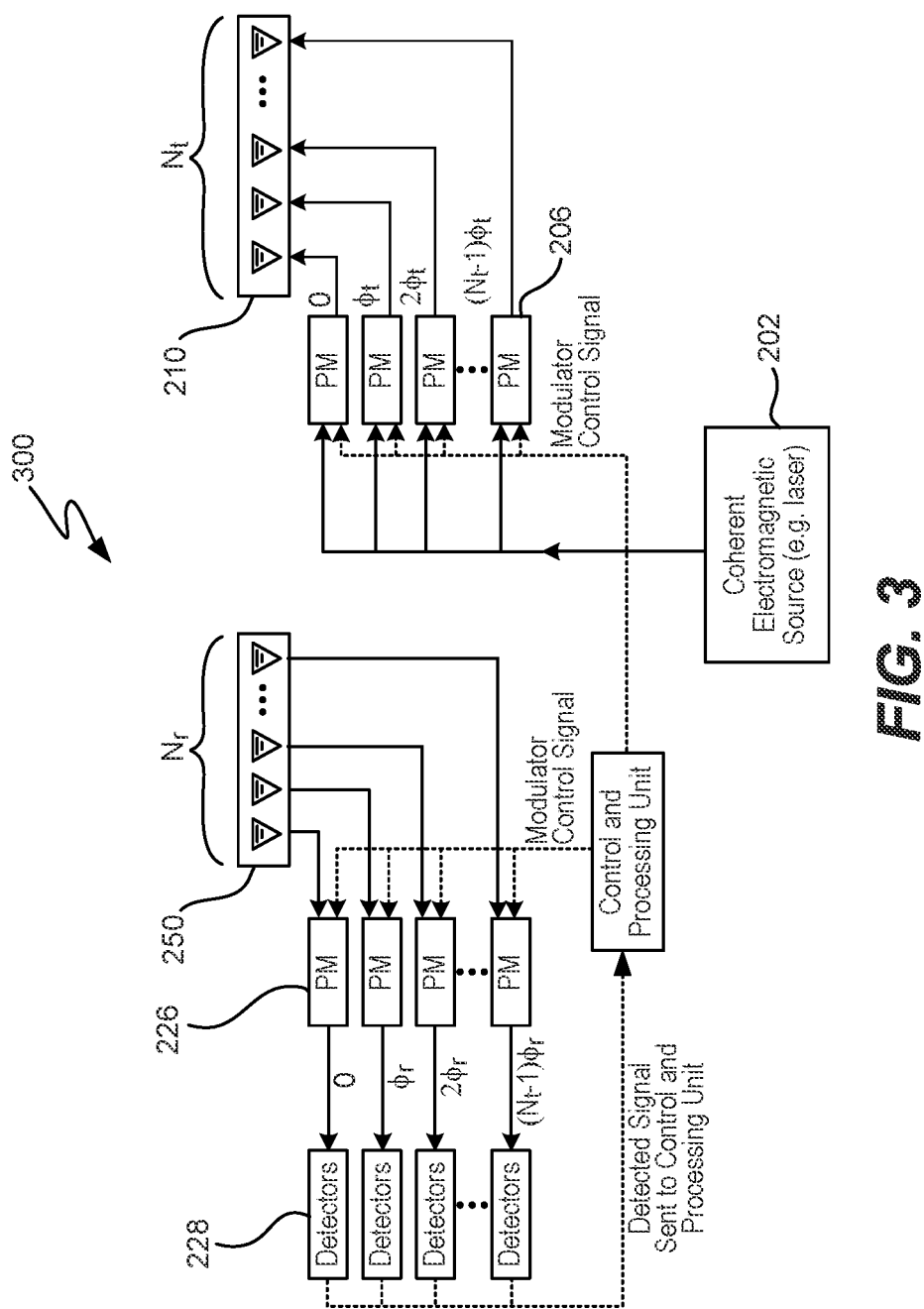
FIG. 3 is a simplified schematic block diagram of a one-dimensional optical phased array transceiver having modular electrical and optical components, as shown in FIGS. 1 and 2.

FIG. 3 is a simplified schematic block diagram of an optical transceiver array 300 having $N_t$ transmitters, $N_r$ receivers, and a multitude of optical, opto-electronic, and electrical circuitry disposed on modualt PIC and EIC tiles as described above. The optical signal generated by laser source 202 is phase modulated by a different one of phase modulators (PM) 206 and transmitted by a different one of the transmit antennas, collectively identified using reference number 210. The signals received by receive antennas 250 are modulated in phase by PMs 226 and detected by detectors 228. The output signals of the detectors is received by control and processing unit 224 which, in turn, controls the phases of PMs 206 and 226.

The above embodiments of the present disclosure are illustrative and not limitative. Embodiments of the present disclosure are not limited by the dimension(s) of the array or the number of transmitters/receivers disposed in each array. Embodiments of the present disclosure are not limited by the wavelength of the electromagnetic or optical source used in the array. Embodiments of the present invention are not limited to the circuitry, such as phase modulators, splitters, detectors, control unit, mixers, and the like, used in the transmitter or receiver arrays. Embodiments of the present disclosure are not limited by the number or shape of the PIC and/or EIC tiles. Other additions, subtractions or modifications are obvious in view of the present disclosure and are intended to fall within the scope of the appended claims.

What is claimed is:

1. An optical phased array comprising:
a first plurality of tiles forming an array of optical signal transmitters and/or receivers, each tile comprising optical components for processing of an optical signal received by the tile;
a second plurality of tiles each positioned below a different one of the first plurality of tiles and each comprising a circuit for processing of an electrical signal, wherein each of the second plurality of tiles is in electrical communication with one or more of the first plurality of tiles, wherein each of the first plurality of tiles is adapted to receive and couple to a third tile comprising the optical components, and wherein each of the second plurality of tiles is adapted to receive and couple to a fourth tile comprising the electrical circuit.

2. The optical phased array of claim 1 wherein said first and second plurality of tiles are disposed on a printed circuit board.

3. The optical phased array of claim 1 wherein said optical phased array is adapted to receive a continuous-wave laser via an optical distribution medium.

4. The optical phased array of claim 1 wherein the optical distribution medium is an optical fiber.

5. The optical phased array of claim 1 wherein at least each of a subset of the first plurality of tiles comprises a source of laser.

6. The optical phased array of claim 1 wherein the first plurality of tiles have same dimensions.

7. The optical phased array of claim 6 wherein the first plurality of tiles have dimensions that are similar to the dimensions of each of the second plurality of tiles.

8. The optical phased array of claim 1 wherein each of the first and second plurality of tiles has a regular shape.

9. The optical phased array of claim 1 wherein each of the first plurality of tiles is adapted to receive an electrical signal from a first one of the second plurality of tiles positioned therebelow.

10. The optical phased array of claim 1 wherein each of the second plurality of tiles includes an electrical interconnect formed therebelow.

11. The system of claim 10 wherein the first plurality of tiles are capacitively coupled to the second plurality of tiles.

12. The system of claim 10 wherein the first plurality of tiles are magnetically coupled to the second plurality of tiles.

13. The system of claim 10 wherein the first plurality of tiles are connected to the second plurality of tiles using a plurality of electrical contacts.

14. A method of forming an optical phased array comprising:
forming a first plurality of tiles operating as an array of optical signal transmitters and/or receivers, each of the first plurality of tiles comprising optical components for processing of an optical signal received by the tile;
forming a second plurality of tiles each comprising circuitry for processing of an electrical signal; and
positioning each of the second plurality of tiles below a different one of the first plurality of first tiles, wherein each of the second plurality of tiles is in electrical communication with one or more of the first plurality of tiles, and wherein each of the first plurality of tiles is adapted to receive and couple to a third tile comprising the optical components, and wherein each of the second plurality of tiles is adapted to receive and couple to a fourth tile comprising the electrical circuit.

15. The method of claim 14 further comprising:
disposing the first and second plurality of tiles on a printed circuit board.

16. The method of claim 15 wherein each of the first and second plurality of tiles has a regular shape.

17. The method of claim 14 further comprising:
delivering a continuous-wave laser to the first plurality of tiles via an optical distribution medium.

18. The method of claim 14 wherein the optical distribution medium is an optical fiber.

19. The method of claim 14 further comprising:
forming a laser on each of a subset of the first plurality of tiles.

20. The method of claim 14 optical wherein the first plurality of tiles have same dimensions.

21. The method of claim 20 wherein each of the first plurality of tiles has dimensions that are similar to the dimensions of each of the second plurality of tiles.

22. The method of claim 14 further comprising:
delivering an electrical signal from each of the second plurality of tiles to a different one of the first plurality of tiles positioned thereabove.

23. The method of claim 14 further comprising:
forming an electrical interconnect below each of the second plurality of tiles.

24. The method of claim 23 further comprising:
coupling the first plurality of tiles to the second plurality of tiles via a plurality of electrical contacts.

25. The method of claim 23 further comprising:
capacitively coupling the first plurality of tiles to the second plurality of tiles.

26. The method of claim 23 further comprising:
magnetically coupling the first plurality of tiles to the second plurality of tiles.

* * * * *